US010652526B2

(12) United States Patent
Liu et al.

(10) Patent No.: US 10,652,526 B2
(45) Date of Patent: May 12, 2020

(54) THREE-DIMENTIONAL DISPLAY SYSTEM BASED ON DIVISION MULTIPLEXING OF VIEWER'S ENTRANCE-PUPIL AND DISPLAY METHOD THEREOF

(71) Applicant: SUN YAT-SEN UNIVERSITY, Guangdong (CN)

(72) Inventors: Lilin Liu, Guangdong (CN); Dongdong Teng, Guangdong (CN)

(73) Assignee: SUN YAT-SEN UNIVERSITY, Guangdong (CN)

(*) Notice: Subject to any disclaimer, the term of this patent is extended or adjusted under 35 U.S.C. 154(b) by 83 days.

(21) Appl. No.: 15/481,467

(22) Filed: Apr. 7, 2017

(65) Prior Publication Data

US 2017/0310954 A1     Oct. 26, 2017

(30) Foreign Application Priority Data

Apr. 25, 2016    (CN) .......................... 2016 1 0257849
May 10, 2016    (CN) .......................... 2016 1 0304663

(51) Int. Cl.
| | |
|---|---|
| *H04N 13/341* | (2018.01) |
| *H04N 13/324* | (2018.01) |
| *H04N 13/398* | (2018.01) |
| *H04N 13/144* | (2018.01) |
| *H04N 13/337* | (2018.01) |
| *H04N 13/344* | (2018.01) |

(52) U.S. Cl.
CPC ......... *H04N 13/341* (2018.05); *H04N 13/144* (2018.05); *H04N 13/324* (2018.05); *H04N 13/398* (2018.05); *H04N 13/337* (2018.05); *H04N 13/344* (2018.05); *H04N 2213/008* (2013.01)

(58) Field of Classification Search
CPC .. H04N 13/144; H04N 13/341; H04N 13/398; H04N 13/324; H04N 2213/008; H04N 13/344; H04N 13/337
USPC .......................................................... 348/42
See application file for complete search history.

(56) References Cited

U.S. PATENT DOCUMENTS

| | | | | |
|---|---|---|---|---|
| 5,875,055 | A | * 2/1999 | Morishima | ........ G02B 27/2214 359/465 |
| 2002/0054434 | A1 | * 5/2002 | Florczak | ................ G02B 5/128 359/619 |

(Continued)

*Primary Examiner* — Tung T Vo
(74) *Attorney, Agent, or Firm* — JCIPRNET

(57) ABSTRACT

The invention features techniques and systems for presenting two or more perspective views to each eye of the viewer, through division multiplexing of the viewer's entrance-pupil. The system is constituted by a selective-aperture array with each aperture being transparent only to light beams with some special characteristics, at least one display screen for optical information presentation, and other optional elements. The optical message on at least one display screen propagates to the selective-aperture array directly, or be directed to the selective-aperture array or the eye of the viewer by other optional elements. Through selective filtering by the apertures with temporal filtering characteristics or exclusive filtering characteristics, multiple perspective views get presented to an eye of the viewer through the selective-aperture array. Light rays different perspective views superimpose into real spatial light spots that the eye can focus on naturally, resulting in overcoming of the accommodation-convergence conflict.

9 Claims, 18 Drawing Sheets

(56) References Cited

U.S. PATENT DOCUMENTS

| | | | |
|---|---|---|---|
| 2004/0080938 A1* | 4/2004 | Holman | F21S 8/08 362/231 |
| 2004/0184145 A1* | 9/2004 | Fridman | G02B 27/2214 359/462 |
| 2008/0117233 A1* | 5/2008 | Mather | G09G 3/003 345/690 |
| 2009/0067057 A1* | 3/2009 | Sprague | G02B 27/0101 359/630 |
| 2009/0309887 A1* | 12/2009 | Moller | H04N 13/305 345/522 |
| 2010/0113100 A1* | 5/2010 | Harmon | H04M 1/0216 455/566 |
| 2012/0162212 A1* | 6/2012 | Takahashi | H04N 13/305 345/419 |
| 2012/0268481 A1* | 10/2012 | Niioka | H04N 13/317 345/619 |
| 2013/0077154 A1* | 3/2013 | Popovich | G02B 27/2214 359/316 |
| 2014/0300711 A1* | 10/2014 | Kroon | H04N 13/302 348/51 |
| 2015/0002645 A1* | 1/2015 | Moller | H04N 13/305 348/56 |
| 2016/0165223 A1 | 6/2016 | Liu et al. | |

* cited by examiner

THREE-DIMENTIONAL DISPLAY SYSTEM BASED ON DIVISION MULTIPLEXING OF VIEWER'S ENTRANCE-PUPIL AND DISPLAY METHOD THEREOF

CROSS-REFERENCE TO RELATED APPLICATION

This application claims the priority benefit of China application serial no. 201610257849.6, filed on Apr. 25, 2016, and China application serial no. 201610304663.1, filed on May 10, 2016. The entirety of each of the above-mentioned patent applications is hereby incorporated by reference herein and made a part of this specification.

BACKGROUND OF THE INVENTION

1. Field of the Invention

This invention relates to three-dimensional displays, and more particularly to three-dimensional display free from accommodation-convergence conflict.

2. Description of Related Art

Existing three-dimensional display mainly depends on stereoscopic technology, which projects only one perspective view to each eye of the viewer and results in loss of monocular depth cue. For a displayed spatial point, the convergence of the two passing-through light rays coming from the two perspective views gives a virtual three-dimensional depth perception to the user. However, to observe the perspective views clearly, the viewer need to focus his/her eyes on the display plane. Thus, a discrepancy between the convergence distance and the focusing distance is generated, i.e. accommodation-convergence conflict. In the natural situation of observing a real object, two cone-shaped beams from a real object point cover eyes of the viewer. The perceived cone-shaped beams make the eyes not only focus on the object point, but also converge to the object point. That is to say, the convergence distance and focusing distance are consistent. So, the accommodation-convergence conflict in the stereoscopic display violates the human's physiological habit. Actually, this conflict is the principle cause of visual fatigue, which has become the bottleneck hindering the popularization of the three-dimensional display technology.

SUMMARY OF THE INVENTION

The invention features techniques and systems for presenting two or more perspective views to each eye of the viewer, through division multiplexing of the viewer's entrance-pupil. Light rays from two or more perspective views perceived by one eye through different regions of the pupil superimpose into real spatial light spots that the eye can focus on naturally, resulting in overcoming of the accommodation-convergence conflict.

In general, on one aspect, the invention features new three dimensional display systems. Embodiments of the display system comprise a selective-aperture array with each selective aperture being transparent only to light beams with some special characteristics, and at least one display screen for optical information presentation.

In some embodiment, the display system further comprises one or more of following components: a projecting lens to project amplified virtual images of the at least one display screen, a guiding structure to redirect propagating direction of the light beams from the at least one display screen, a combining structure to group different display screens for the projecting lens, a modulation element to adjust the exclusive characteristics of the light beams from the at least one display screen, and at least one baffle for light beams blocking.

The selective-aperture array may be designed based on temporal characteristics, which means that selective apertures are turned on in a time sequential way and the light beams from the at least one display screen can only go through the turned-on aperture at a time-point.

The selective-aperture array may be designed based on exclusive characteristics, such as orthogonal polarization, wavelengths with great different transparency to different filters, orthogonal spin states, and so on. Under this condition, a selective aperture is transparent only to the light beams with the corresponding characteristic.

The selective-aperture array may be designed based on the complex of temporal characteristics and exclusive characteristics. Under this condition, different groups of apertures are turned on sequentially. When a group of apertures are turned on, one aperture of this group is only transparent to the light beams with the corresponding exclusive characteristic.

During operation, the light beams from the display screen may propagate to the selective-aperture array directly, or be directed to the selective-aperture array by the projecting lens, or by the guiding structure, or by both the projecting lens and the guiding structure. When two or more display screens are employed for the selective-aperture array, light beams from these display screens may be directed to the selective-aperture array by the combining structure, or by both the combining structure and the guiding structure, or by both the combining structure and the projecting lens, or by the combining structure, the projecting lens and the guiding structure all together. In addition, the light passing through the selective-aperture array may enter the eye directly, or be re-directed to the eye through the guiding structure.

Embodiments of the display systems may include any of the following features.

The display screen may be an OLED display screen, or a LED display screen, or a liquid crystal display screen, or a Digital Light Processing (DMD) screen, or a reflecting screen which reflects the incident optical image, or a transmitting screen which transmits the incident optical image, or a diffraction screen which diffracts the incident optical image.

The projecting lens may be a lens, or an optical element functioning as a lens, or a group of optical elements functioning as a lens. Based on this, the projecting lens may be focal length-tunable lens, imaging the at least one display screen to multiple planes in a time-sequential way.

Two or three of the projecting lens, the guiding structure and the combining structure can be assembled into one optical structure, such as the polyhedral optical device which has some or all functions of diffraction, refraction and reflection simultaneously.

In general, on another aspect, the invention includes a display method of presenting two or more perspective views through the selective-aperture array of temporal characteristics, which comprises: (i) segment at least one display screen into an integer number of sub-screens, including the case that a whole display screen is taken as a sub-screen; (ii) at one time-point, a selective aperture turns on, while other selective apertures get turned off; (iii) synchronously, pixels on each sub-screen get refreshed by the perspective view converging to a point of the zone (including the boundaries) enclosed by the lines connecting marginal points of the turned-on selective aperture and marginal points of this sub-screen; and (iv) at different time-points, different selective apertures turn on sequentially, with the at least one display screen being refreshed by corresponding message synchronously.

The invention may include a further method of presenting two or more perspective views through the selective-aperture array of exclusive characteristics, which comprises: (i) pixels of at least one display screen are grouped into different pixel sets. All pixels of each pixel set emit light beams with a special characteristic, which makes the light beams being not blocked only by a corresponding selective aperture; (ii) segment at least one display screen into an integer number of sub-screens, including the case that a whole display screen is taken as a sub-screen; and (iii) refresh pixels belonging to each pixel set on each sub-screen by the perspective view converging to a point of the zone (including the boundaries) enclosed by the lines connecting marginal points of the corresponding selective aperture and marginal points of this sub-screen.

The invention may include a further method of presenting two or more perspective views through the selective-aperture array of the complex characteristics, which comprises: (i) the selective apertures are divided into different teams, each of which consists of selective apertures with different exclusive characteristics; (ii) pixels of at least one display screen are grouped into different pixel sets. All pixels of each pixel set emit light beams with a special characteristic, which makes the light beams being not blocked only by a corresponding selective aperture of each team; (iii) segment at least one display screen into an integer number of sub-screens, including the case that a whole display screen is taken as a sub-screen; (iv) at one time-point, a team of selective apertures are turned on, while other teams of selective apertures get turned off; (v) synchronously, refresh pixels belonging to each pixel set on each sub-screen by the perspective view converging to a point of the zone (including the boundaries) enclosed by the lines connecting marginal points of corresponding selective aperture and marginal points of this sub-screen; and (vi) at different time-points, different teams of selective apertures are turned on sequentially, with the pixel sets being refreshed by corresponding messages synchronously.

The details of one or more embodiments of the invention are set forth in the accompanying drawings and description below. Other features, objects, and advantages of the invention will be apparent from the description, drawings, and claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 23 presents the working state at one time point of the system with a modulation element when the selective apertures A1 and A2 get turned on.

FIG. 24 presents the working state at one time point of the system with a modulation element when the selective apertures A2 and A3 get turned on.

DESCRIPTION OF THE EMBODIMENTS

Three dimensional display systems that embody the invention depend on the division multiplexing of the viewer's entrance-pupil. Through an aperture array with selective characteristics, different perspective views to different viewpoints around the aperture array are presented. When the interval between adjacent view-points is designed appropriately, the eye adjacent to the aperture array can perceive light beams from two or more perspective views through different regions of the pupil. These perceived light beams overlap into real spatial light spots that the eye can focus on naturally, thus overcoming accommodation-convergence conflict.

Figure 1:
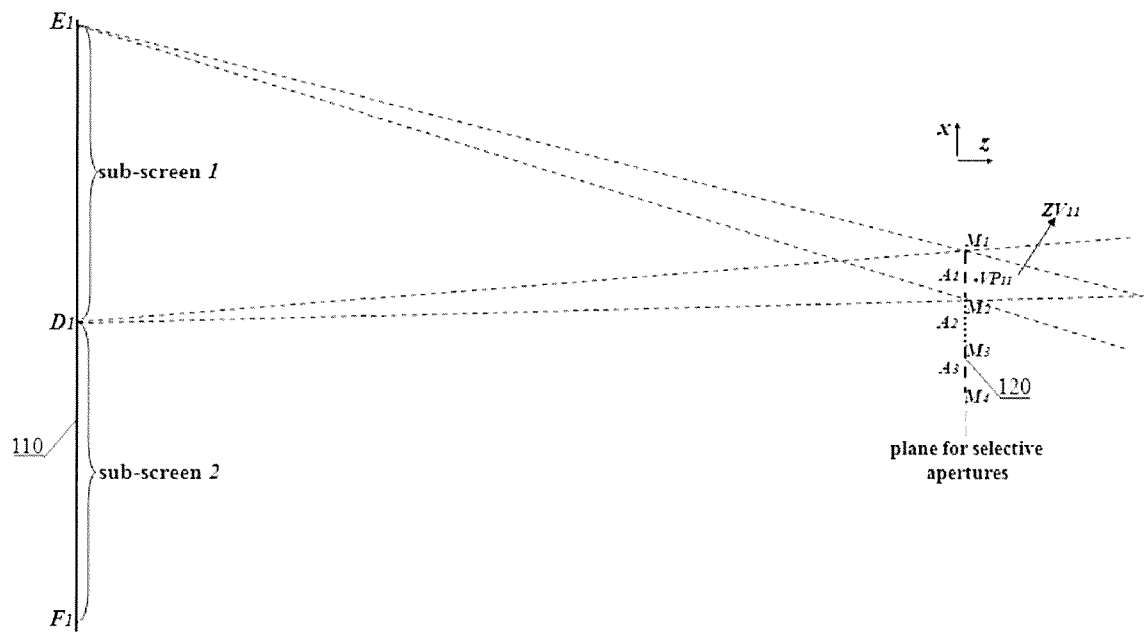
FIG. 1 shows the guide line of loading optical messages on a display screen.
Figure 2:
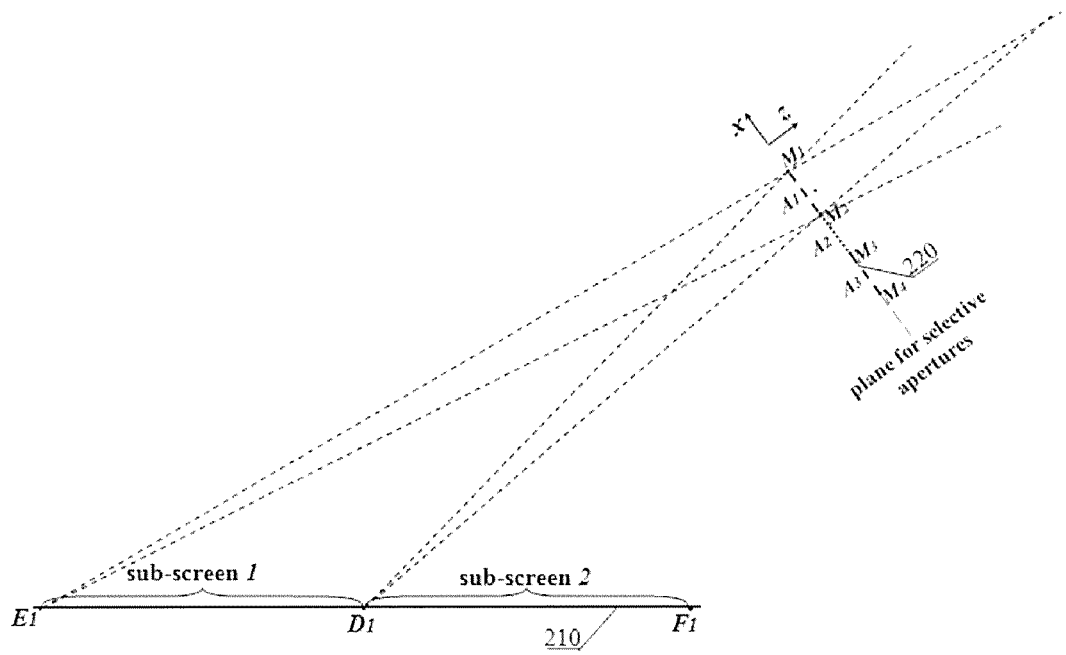
FIG. 2 shows the non-parallel spatial relationship between the selective-aperture array and the display screen.

FIG. 1 shows the guide line on how to obtain loading optical information for a display screen. Here a selective-aperture array 120 consisting of N=3 selective apertures is taken as an example, with $A_1$, $A_2$ and $A_3$ denoting the three selective apertures, respectively. The display screen 110 is divided into M sub-screens along the alignment direction of the selective apertures. Here M=2 is taken as the example for simplification. $E_1$, $D_1$ and $F_1$ are the marginal points of the sub-screens. Connecting the marginal points of a sub-screen (sub-screen m) and the marginal points of a selective aperture ($A_n$), a viewpoint-selecting zone enclosed by these lines is denoted as $ZV_{mn}$, i.e. the $ZV_{11}$ in FIG. 1 in the x-z plane. The viewpoint-selecting zone is with the boundaries included. A point $VP_{mn}$ in the $ZV_{mn}$ is taken as the viewpoint, e.g. the point $VP_{11}$ in FIG. 1. Here, the former subscript denotes the order number of the corresponding sub-screen and the latter subscript denotes the order number of the corresponding selective aperture. On the sub-screen m, the pixels, having the characteristic that light beams emitting from which can pass through the aperture $A_n$, will display the corresponding content of the perspective view converging to the $VP_{mn}$. Different partial perspective views on all the M sub-screens for aperture $A_n$ are tiled into a hybrid perspective view that is prepared for the selective aperture $A_n$. Other selective apertures play their roles by the same method. For the selective apertures with temporal characteristics, the hybrid perspective view for a selective aperture is refreshed by the display screen when the aperture gets turned on. For the selective apertures of exclusive characteristics, the selective aperture is always transparent to the corresponding hybrid perspective view. The interval between adjacent selective apertures is designed to be small enough. For a display point, two or more passing-through light beams coming from different displayed perspective views will be perceived by the eye near to the selective aperture array. Thus, these passing-through lines converge into a real spatial light spot that the eye can focus on, overcoming the accommodation-convergence conflict. In these processes, the value of M may choose 1. Under this condition, the sub-screen is just the whole display screen. The above guide line keeps operating in the given embodiments. In the FIG. 1, the display screen is placed parallel with the selective-aperture array. Actually, they may be designed with a non-parallel spatial relationship, as shown in the FIG. 2. Furthermore, the selective apertures are aligned along a straight one-dimensional direction in the FIGS. 1 and 2. They also may also be aligned along a one-dimensional curve, or even along two directions on a two-dimensional plane or two-dimensional curved surface. The display screen also may be panel screen, or curved-screen. And different display screens and/or their images may be placed in parallel, or not. Another extension lies in the design of the aperture size. In FIG. 1, the aperture size of the selective apertures is set to be equal to the selective-aperture interval. In fact, the aperture size may be set smaller than the selective-aperture interval. In the following embodiments, seamlessly aligned one-dimensional selective apertures and parallel spatial relationship between panel display screens and/or their images and the selective-aperture array are mainly used for description of the embodiments.

Figure 3:
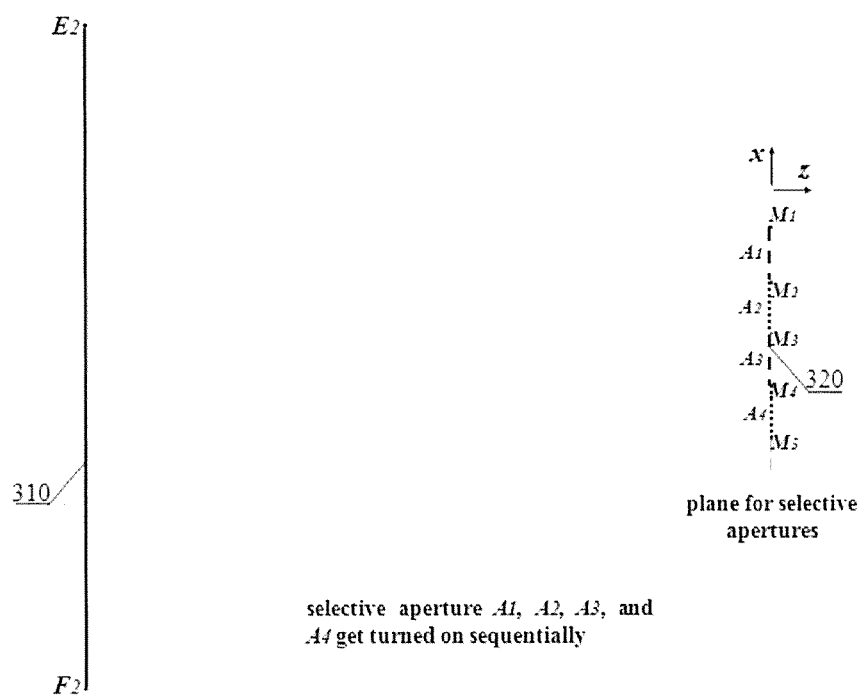
FIG. 3 is an embodiment of a three-dimensional display system with a display screen and selective apertures of temporal characteristics.

FIG. 3 shows an embodiment of a three-dimension display system 300 with a display screen 310 and a selective-aperture array 320 of temporal characteristics. Here, N=4 selective apertures are drawn as an example. During the operation, the selective apertures get turned on sequentially and circularly. At each time-point, the display screen 310 is refreshed according to the guide line explained by FIG. 1. Under this condition, light beams emitting from all the pixels on the display screen can pass through the turned-on selective aperture at each time-point. In FIG. 3, the selective apertures may be divided into two groups for two eyes of the viewer, with the interval between the two groups being equal to that between the eyes of the viewer.

Figure 4:
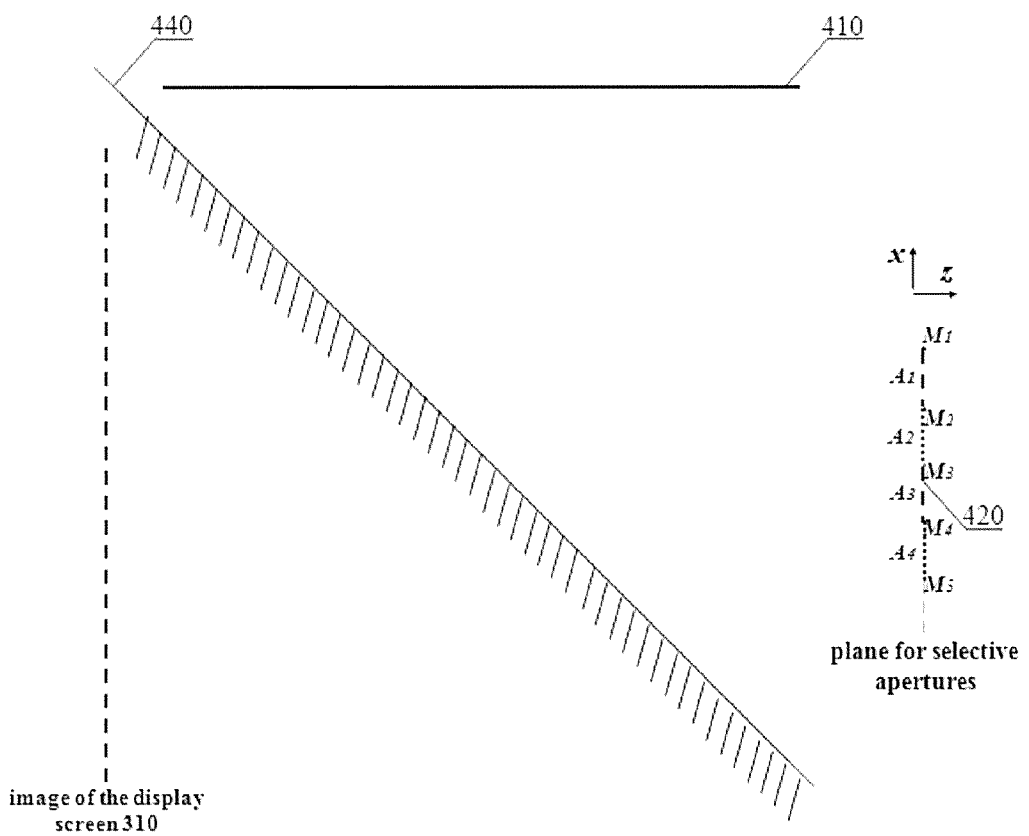
FIG. 4 is an embodiment of a three-dimensional display system with a display screen, a guiding structure, and selective apertures of temporal characteristics.

A guiding structure 440 may also be introduced into the display system, as shown in FIG. 4. The emitted light beams from the display screen get propagated to the selective-aperture array through a reflector which functions as the guiding structure 340. In this case, the mirror image of the display screen 410 is equivalent to the display screen 110 of FIG. 1. When the guiding structure 440 is a half-transmitting and half-reflecting mirror, the displayed three-dimensional scene can mix with the real scene transmitting through the half-transmitting and half-reflecting mirror.

Figure 5:
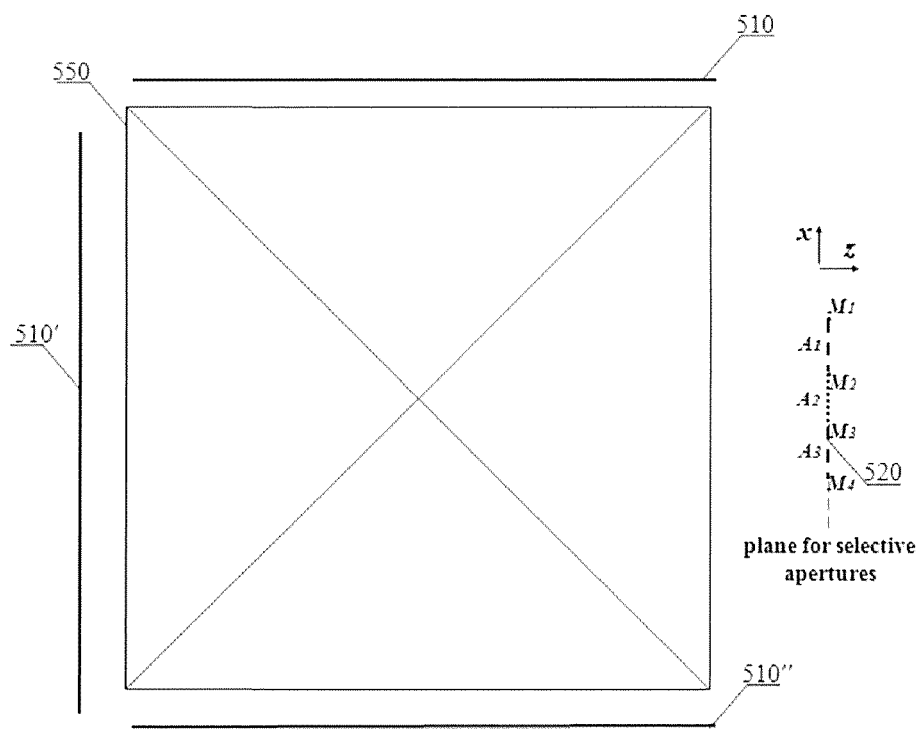
FIG. 5 is an embodiment of a three-dimensional display system with three display screens, a combining structure, and selective apertures of temporal characteristics.

A combining structure 550 may be introduced into the display system, as shown in FIG. 5. Here, the combing structure is constructed by two orthogonal half-transmitting and half-reflecting mirrors. In this case, the images of display screens 510 and 510" work together with the display screen 510' as the equivalent display screens.

Figure 6:
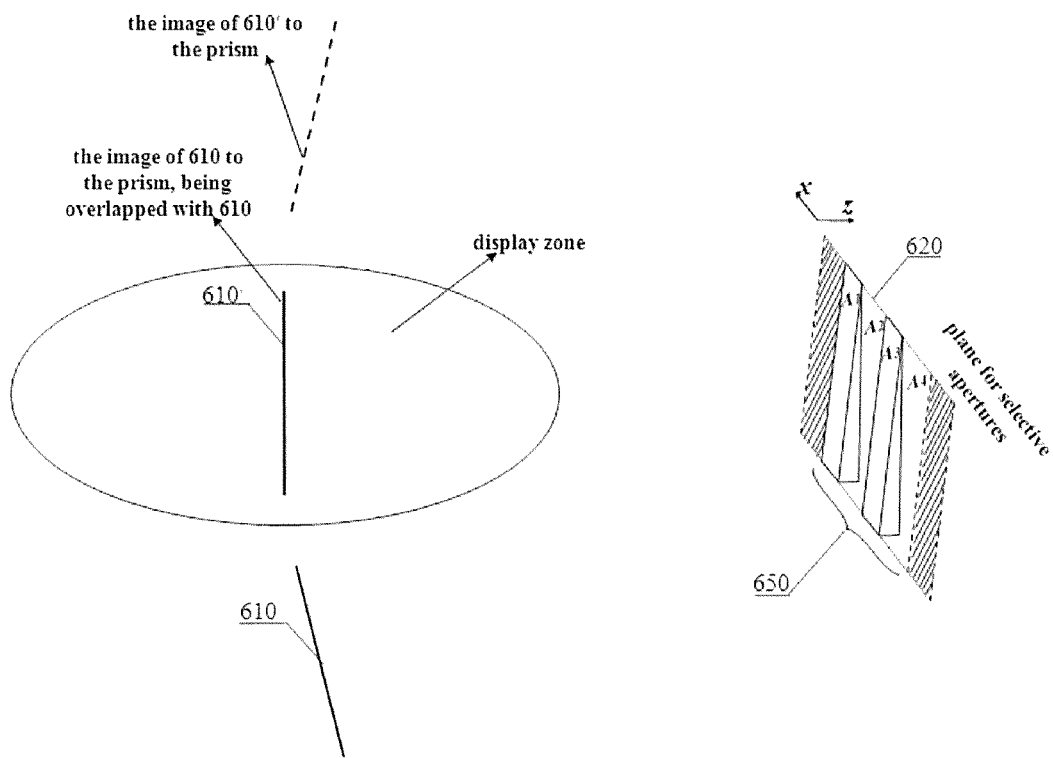
FIG. 6 is an embodiment of a three-dimensional display system with two display screens, selective apertures of temporal characteristics, and a combining structure constructed by prisms.

FIG. 6 shows another embodiment of a three-dimension display system 600 with two display screens 610 and 610', a selective-aperture array 320 of temporal characteristics and a guiding structure. The guiding structure of FIG. 6 is a prism structure, which is lighter in weight compared with the reflector of the FIG. 5. Two prisms are attached to two of the total four selective apertures. Through the prism, the image of the display screen 610 is refracted to the display zone around the display screen 610'. When the eye only pays attention to the display zone, the display screen 610' provides message through the selective apertures $A_2$ and $A_4$ without prism, the display screen 610 provides message through the selective apertures $A_1$ and $A_3$ with prisms. This means two display screens are combined in the embodiment for the selective-aperture gate.

Figure 7:
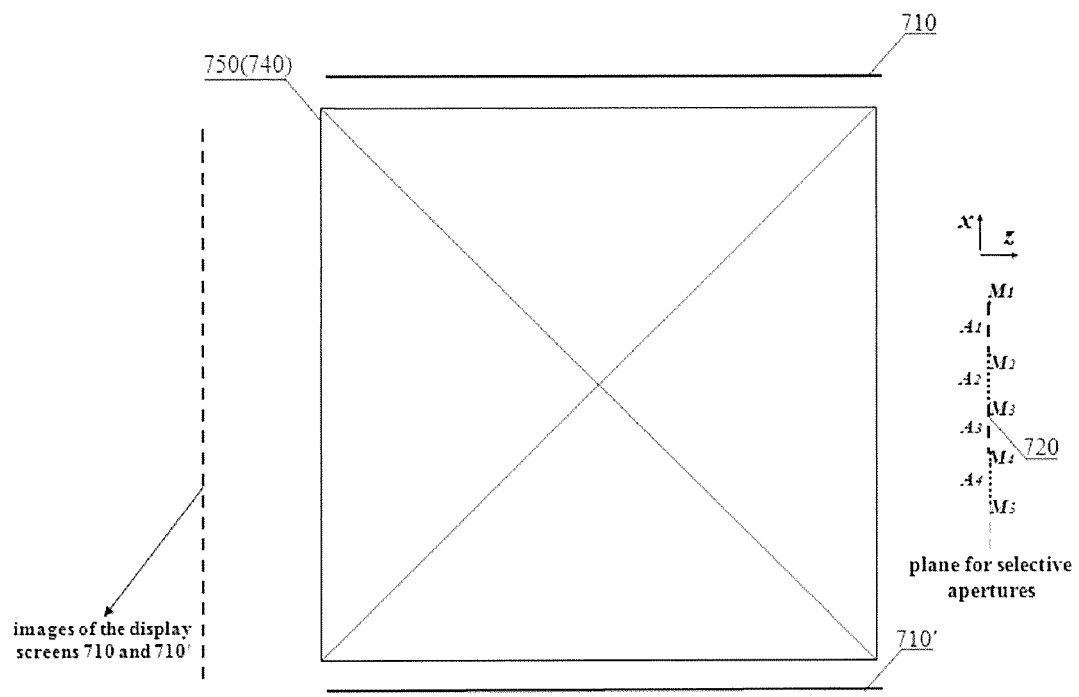
FIG. 7 is an embodiment of a three-dimensional display system with two display screens, an element which plays functions of both the combining structure and the guiding structure, and selective apertures of temporal characteristics.

Removing the display screen 510' of FIG. 5, the displayed three-dimensional screen can mix with the real scene transmitting through the half-transmitting and half-reflecting mirrors, which work as the combing structure and guiding structure simultaneously, as shown in FIG. 7.

Figure 8:
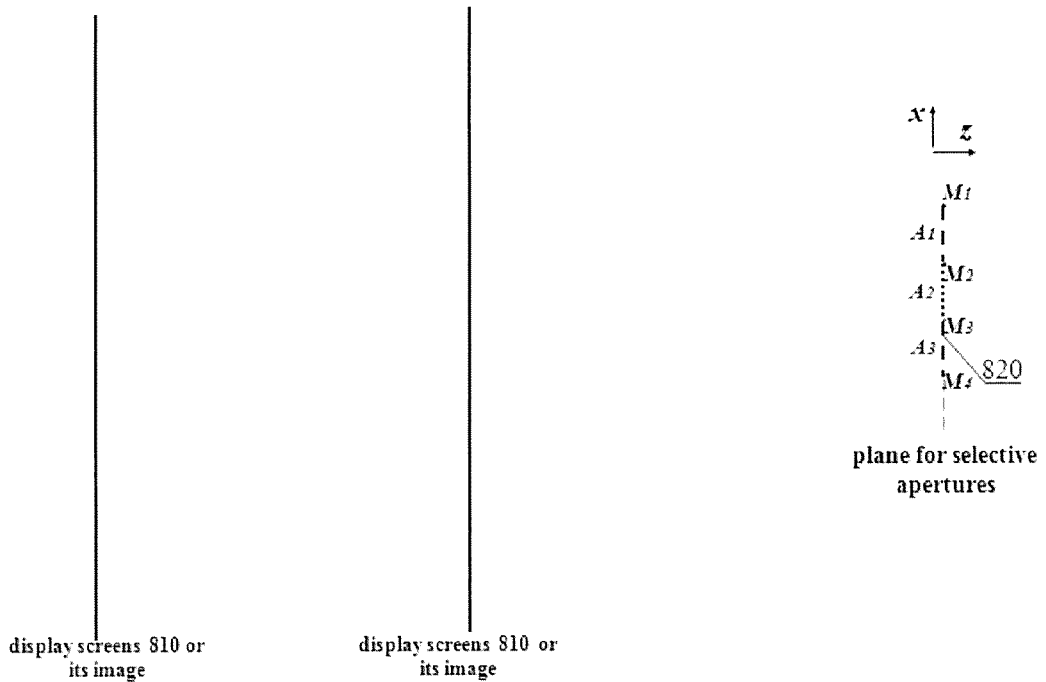
FIG. 8 is an embodiment of a three-dimensional display system with display screens or display screens' images spatially separated.

In the embodiments shown by FIGS. 5, 6 and 7, the display screens and/or the display screens' images may have three types of message loading modes. Firstly, when the display screens and/or display screens' images overlap with each other, or the display screens and/or display screens' images intersect by a certain included angle, different display screens may be activated sequentially. Then, following the guide line explained by FIG. 1, each display panel gets refreshed by the message when the display screen is under activating state. Secondly, when the display screens and/or display screens' images coincide along the depth direction perpendicular to the selective-aperture array, but their pixels take some dislocations along the pixel direction; or when the display screens and/or display screens' images intersect by a certain included angle, and the lines connecting a pixel and corresponding viewpoint are all non-collinear, different display screens may be refreshed by the message corresponding to the turned-on selective aperture at the corresponding time-point simultaneously following the guide line explained by FIG. 1. Thirdly, when different display screens and/or display screen's images are spatially separated, as shown in FIG. 8 where only two display screens/display screen's images are drawn as an example, each different display screen should be refreshed by the message corresponding to the turned-on selective aperture simultaneously following the guide line explained by FIG. 1. Under this condition, each display screen may be set to display the whole target scene, or may also be set to display partial target scene around the screen itself or its image. Actually, FIG. 8 may also be implemented by using transparent display screens with different distances to the selective-aperture array.

Figure 9:
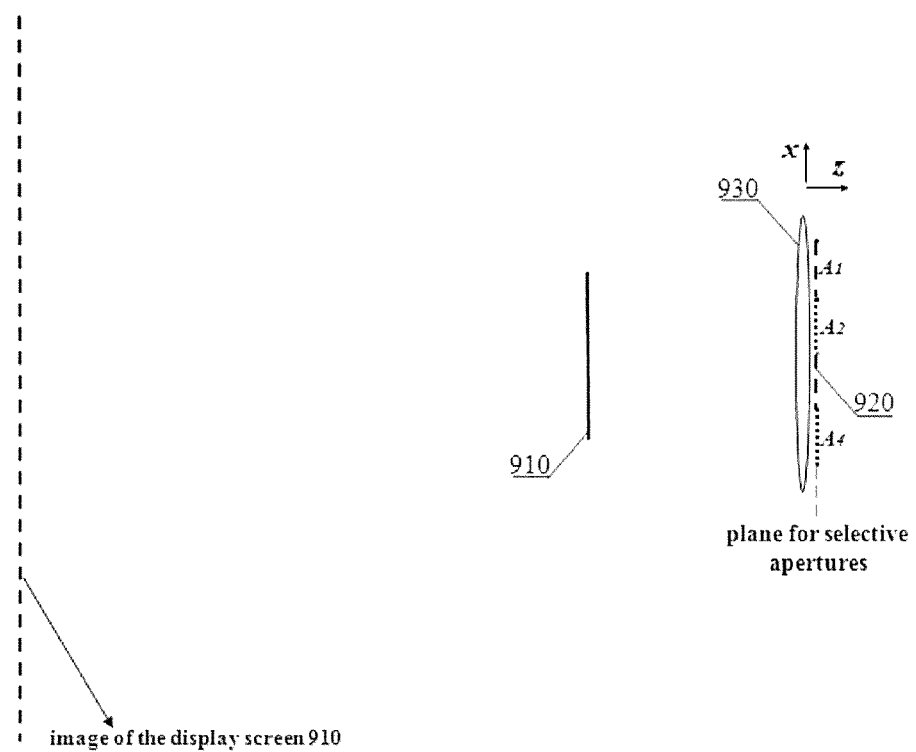
FIG. 9 is an embodiment of a three-dimensional display system with a display screen, a projecting lens, and selective apertures of temporal characteristic.
Figure 10:
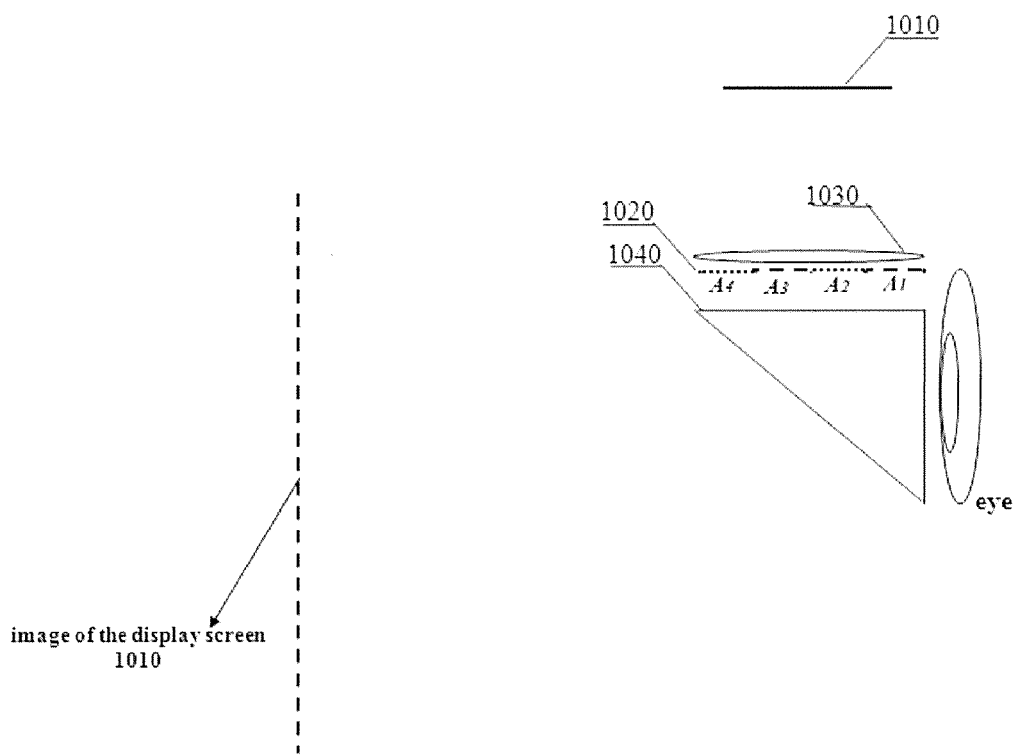
FIG. 10 is an embodiment of a three-dimensional display system with a display screen, a projecting lens, a guiding structure, and selective apertures of temporal characteristics, which can work as an eyepiece of head mounted virtual reality.
Figure 11:
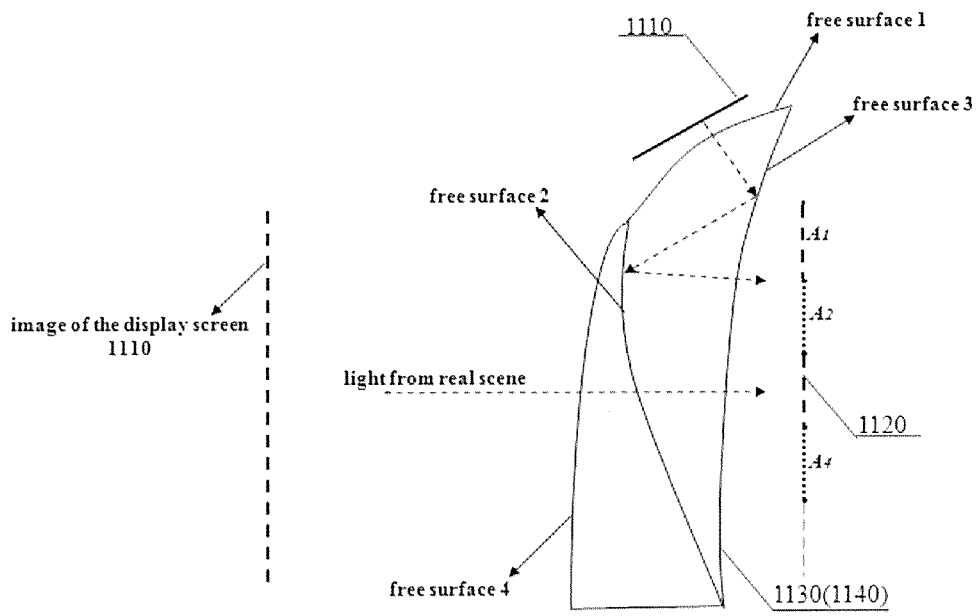
FIG. 11 is an embodiment of a three-dimensional display system with a display screen, a polyhedral optical device with multiple free surfaces, a guiding structure, and selective apertures of temporal characteristics, which can work as an eyepiece of head mounted augment reality. The polyhedral optical device works as combination of guiding structure and projecting lens.
Figure 12:
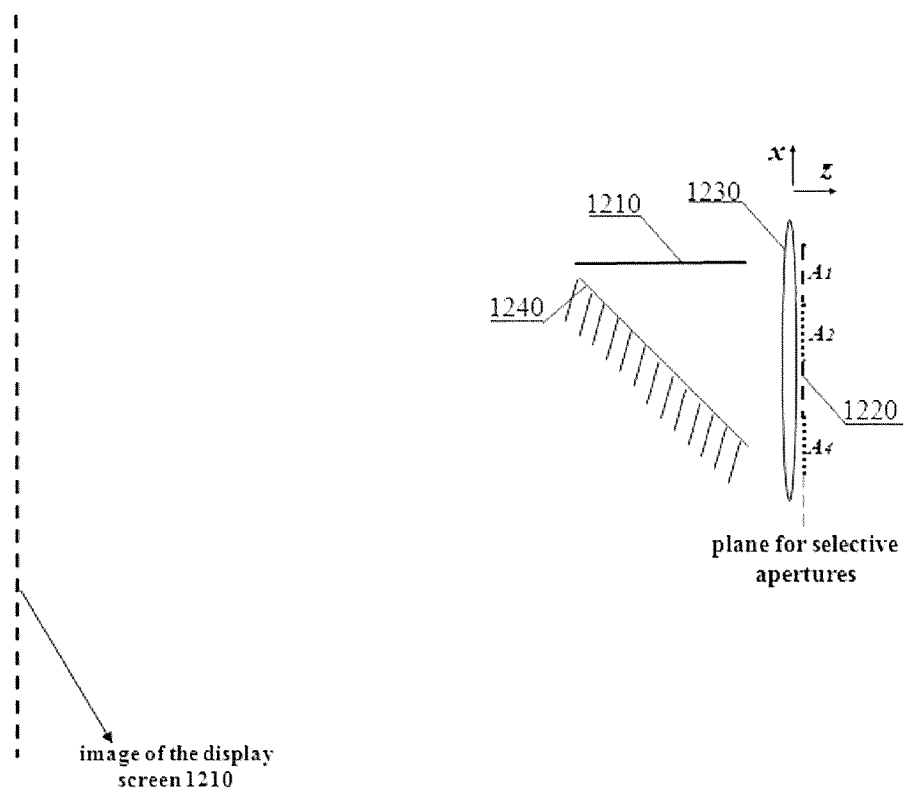
FIG. 12 is an embodiment of a three-dimensional display system with a display screen, a projecting lens, a guiding structure, and selective apertures of temporal characteristic.
Figure 13:
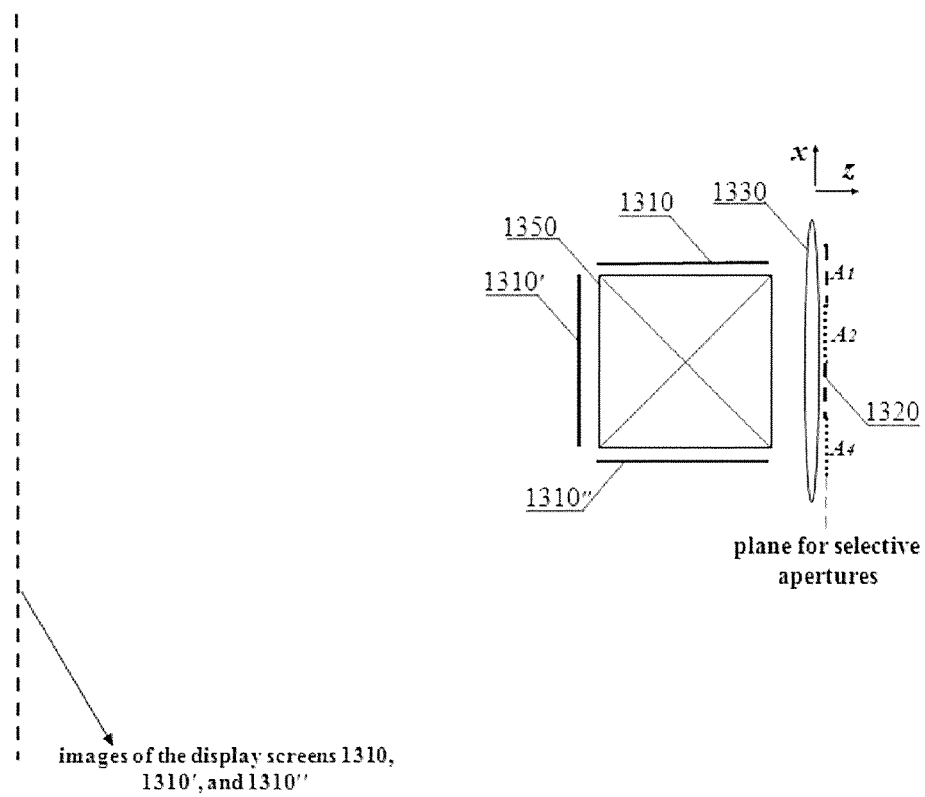
FIG. 13 is an embodiment of a three-dimensional display system with three display screens, a projecting lens, a combining structure, and selective apertures of temporal characteristic.
Figure 14:
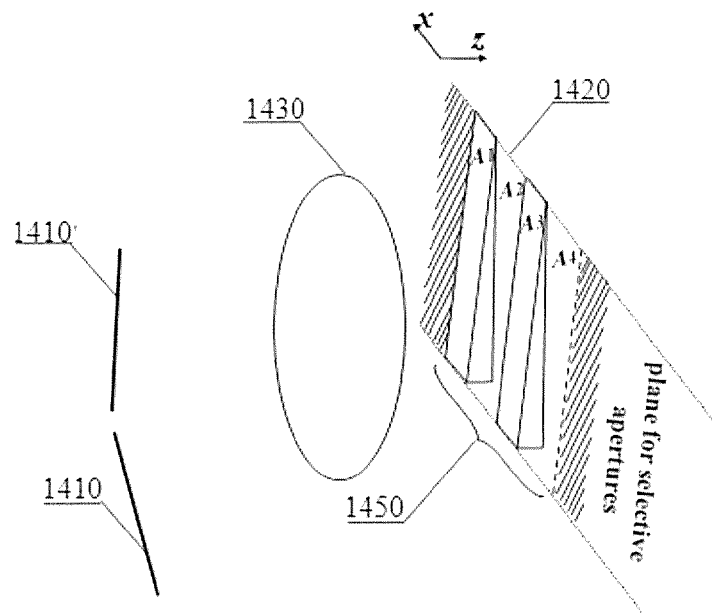
FIG. 14 is an embodiment of a three-dimensional display system with two display screens, a projecting lens, and a combining structure constructed by prisms, and the selective apertures of temporal characteristic.
Figure 15:
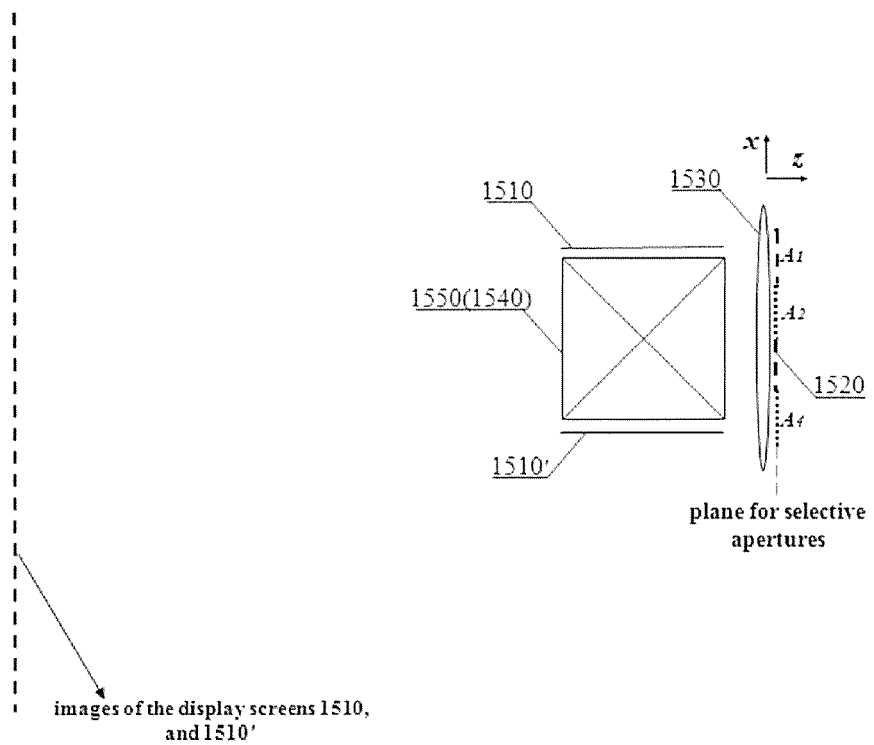
FIG. 15 is an embodiment of a three-dimensional display system with two display screens, an element which plays functions of both the guiding structure and the combing structure, and selective apertures of temporal characteristic.

FIG. 9 shows an embodiment of a three-dimension display system 900 with a display screen 910, a projecting lens 930, and a selective-aperture array 920 of temporal characteristics. Here, four selective apertures are drawn as an example. During the operation, the selective apertures get turned on sequentially and circularly. The display screen 910's image projected by the projecting lens 930 functions as the display plane. At each time-point, following the guide line explained by FIG. 1, the display screen 910 is refreshed by the message corresponding to the turned-on selective aperture. Actually, the structure shown by FIG. 9 can work as an eyepiece of a head-mounted virtual reality system. Two such structures can construct up a head-mounted virtual reality system free from accommodation-convergence conflict. Introducing a half-transmitting and half-reflecting mirror behind the selective-aperture array in the embodiment shown in FIG. 9, the real scene can be transmitted into the eye through the half-transmitting and half-reflecting mirror which functions as guiding structure 1040, as shown in FIG. 10. Thus the displayed three dimensional scenes will be mixed with the real scene, and the structure shown by FIG. 10 can work as an eyepiece of a head-mounted augment reality system. FIG. 11 shows another embodiment which may work as an eyepiece of a head-mounted augment reality system. Different to FIG. 10, in this embodiment, a polyhedral optical device constructed by four free surfaces is placed between the display screen 1110 and the selective-aperture array 1120. The free surface 2 is a half-transmitting and half-reflecting mirror, having the function of reflection. At the same time, it plays another function of imaging the display screen 1110, together with the free surfaces 1 and 3. The free surface 4 is a compensation element eliminating the influence of the free surfaces 2 and 3 on the light from real scene. Similarly, the following embodiments, some may work as eyepieces of a head-mounted virtual reality system, some may work as eyepieces of a head-mounted augment reality system with a guiding structure added between the selective-aperture array and the display screens, or with a polyhedral optical device, such as that in the FIG. 11, added between displays screens and selective-aperture array.

Figure 16:
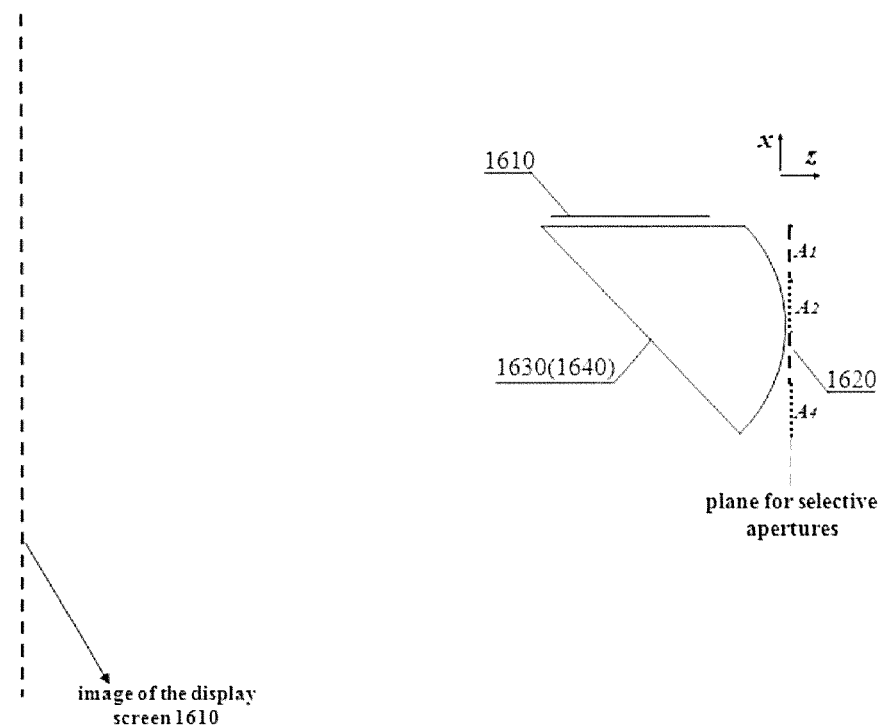
FIG. 16 is an embodiment of a three-dimensional display system with a display screen, an element which plays functions of the projecting lens and the guiding structure, and selective apertures of temporal characteristic.
Figure 17:
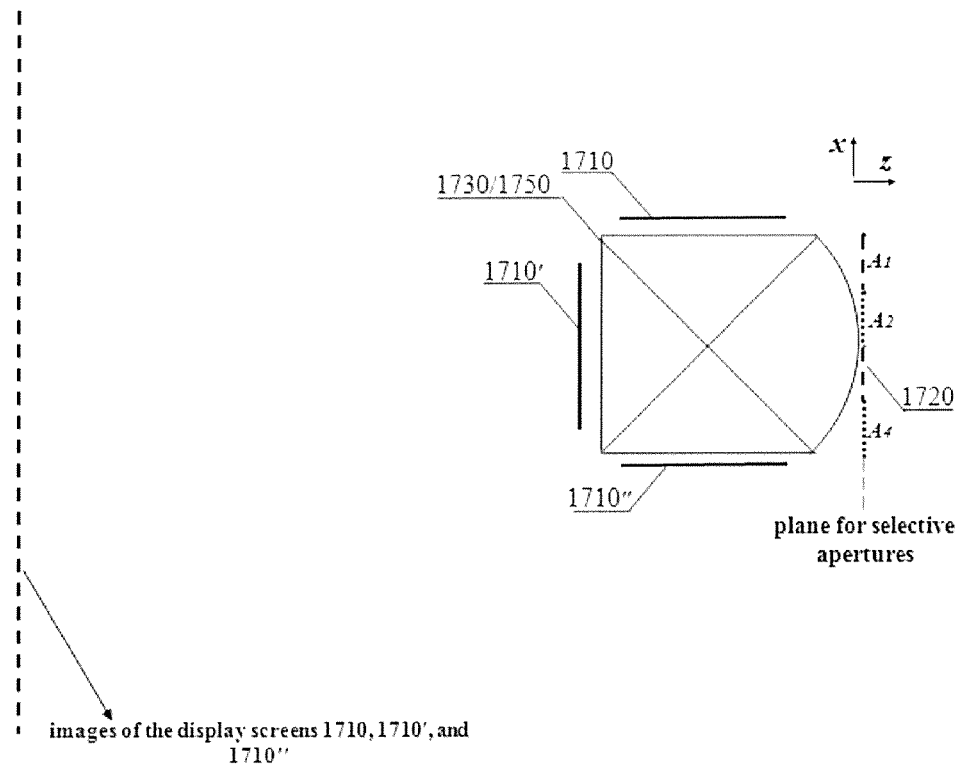
FIG. 17 is an embodiment of a three-dimensional display system with three display screens, an element which plays functions of projecting lens and combining structure, and selective apertures of temporal characteristic.
Figure 18:
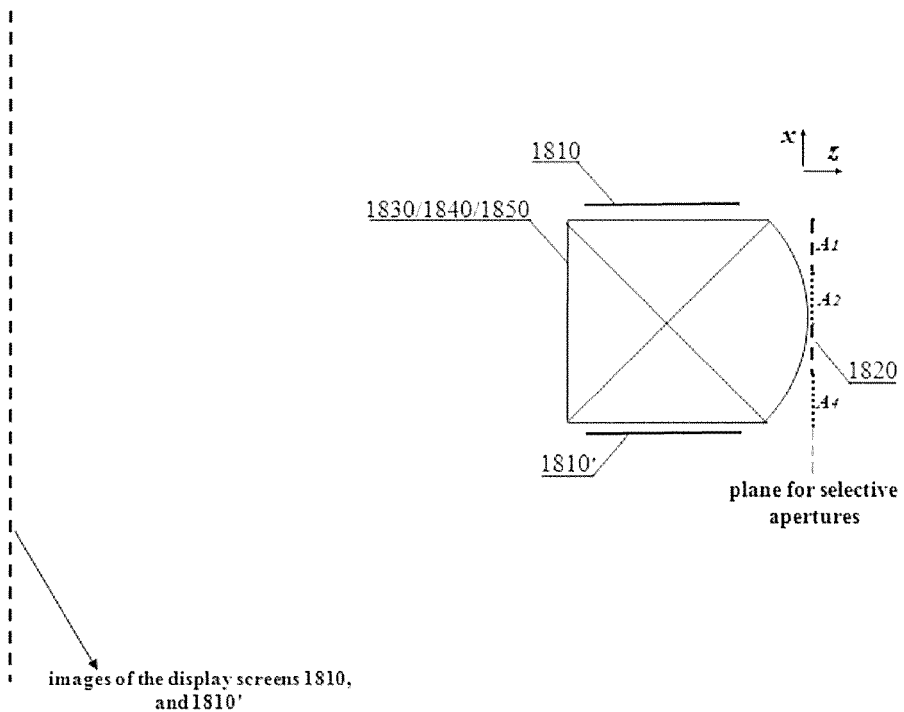
FIG. 18 is an embodiment of a three-dimensional display system with two display screens, an element which plays functions of the projecting lens and the combining structure and the guiding structure, and selective apertures of temporal characteristic.

Similarly, the embodiments shown by FIGS. 4, 5, 6, and 7 may also be implemented when the single selective-aperture array is replaced by a couple of a selective-aperture array and projecting lens, as shown in FIGS. 12, 13, 14, and 15, respectively. Especially, the functions of two or all three of the guiding structure, the projecting lens and the combining structure may be implemented by a hybrid device, such as the polyhedral optical devices shown in FIGS. 16, 17, and 18.

Figure 19:
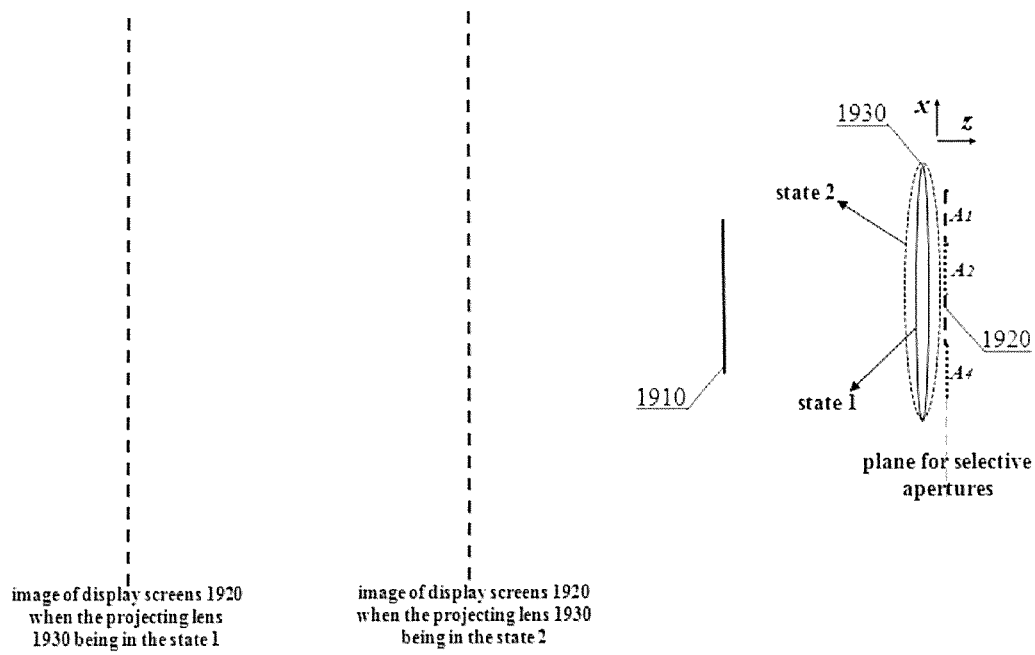
FIG. 19 is an embodiment of a three-dimensional display system employing a projecting lens with the capability of adjusting focus lengths.

In the embodiments shown by FIGS. 13, 14, 15, 17 and 18, display screens' images can be designed to have different distances to the selective aperture array, resulting in the situation similar to FIGS. 5, 6 and 7. A situation similar to FIG. 8 may also be implemented by placing transparent display screens with different distances to the projecting lens. Another possible way is to employ the projecting lens 1930 which could adjust it focus lengths rapidly, as shown in FIG. 19 where two focus states of the projecting lens are shown. This kind of projecting lens may be used in the embodiments of FIG. 10 to FIG. 15. Also, the FIG. 19 may also be implemented by another type of projecting lens, which has different focal lengths to light with different characteristics. For example, the projecting lens is with a focal length to the left circularly polarized light and with another focal length to the right circularly polarized light.

In above embodiments using selective apertures of temporal characteristics, the aperture size may be designed larger than the selective aperture interval. This means partial overlapping of adjacent apertures. For example, taking an electronic control crystal-liquid pixel array as the selective-aperture array can make the sequentially gated adjacent apertures overlap partially.

Figure 20:
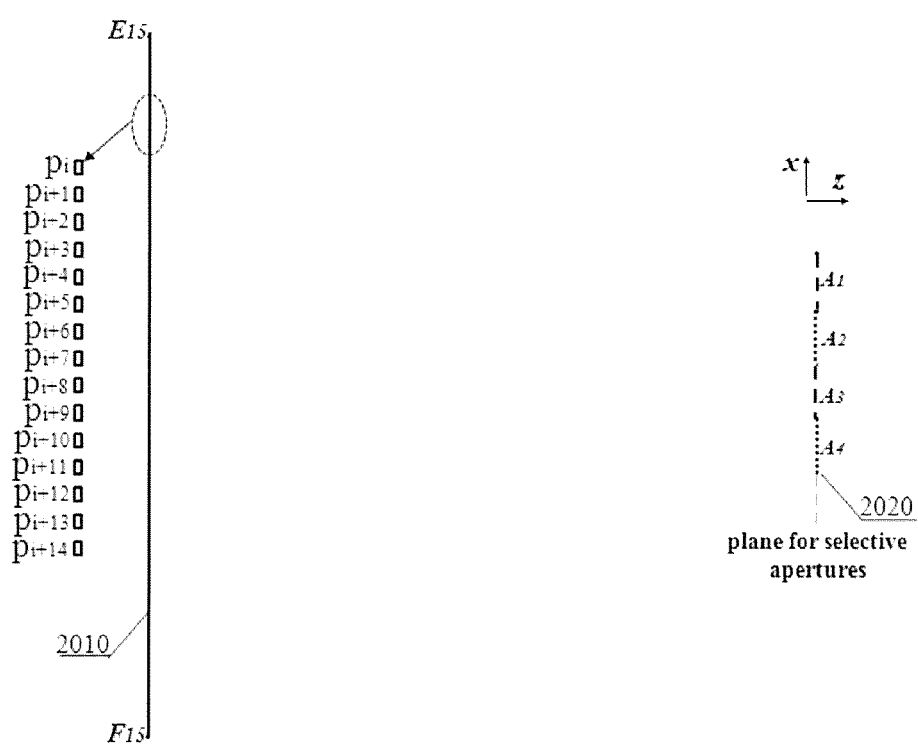
FIG. 20 is an embodiment of a three-dimensional display system with a display screen and selective apertures of exclusive characteristics.

FIG. 20 shows an embodiment of a three-dimension display system 2000 with a display screen 2010 and a selective-aperture array 2020 of exclusive characteristics. Here N=4 selective apertures are taken as an example. Among them, the aperture $A_1$ only permits red lights with a horizontal polarization direction passing through, the aperture $A_2$ only permits blue lights with a horizontal polarization direction passing through, the aperture $A_3$ only permits red lights with a vertical polarization direction passing through, and the aperture $A_4$ only permits blue lights with a vertical polarization direction passing through. Along the x-direction (i.e. apertures' arraying direction), grouping the pixels with an interval of N−1=3 pixels into a pixel set, which has the characteristics that light beams from the included pixels only can pass through the corresponding selective aperture. Totally, N=4 pixel sets exist, which corresponds to the N=4 selective apertures respectively. In FIG. 20, a row of pixels along the x-direction is shown as an example. Pixels $p_i$, $p_{i+4}$, $p_{i+8}$ . . . are grouped into the pixel set 1, which corresponds to the selective aperture $A_1$. They emit red light beams with a horizontal polarization direction. Pixels $p_{i+1}$, $p_{i+5}$, $p_{i+9}$ . . . are grouped into the pixel set 2, corresponding to the selective aperture $A_2$, emitting blue light beams with a horizontal polarization direction. By the same way, N=4 pixel sets get assigned. According to the guide line explained by FIG. 1, on each sub-screen, pixels belonging to different pixel sets are refreshed by the corresponding partial perspective view, resulting in the presentation of multiple perspective views through the selective-aperture array. In FIG. 20, the selective apertures may be divided into two groups for two eyes of the viewer, with the interval between the two groups being equal to that between the eyes of the viewer.

Similar to the optical designs shown in FIGS. 4, 5, 6 and 7, the guiding structure and the combining structure can also be introduced into the display system shown by FIG. 20. When multiple display screens are introduced into the system with selective apertures of exclusive characteristics, the display screens/display screen's images may have three types of message loading modes. Firstly, when the display screens and/or display screens' images overlap with each other, or the display screens and/or display screens' images intersect by a certain included angle, pixels on different display screens and/or their images may be designed with different exclusive characteristics. Secondly, when the display screens and/or display screens' images coincide along the depth direction perpendicular to the selective-aperture array, but their pixels take some dislocations along the pixel direction; or when the display screens and/or display screens' images intersect by a certain included angle, and the lines connecting a pixel and corresponding viewpoint are all non-collinear, different display screens may be refreshed by the message corresponding to the turned-on selective aperture at the corresponding time-point simultaneously following the guide line explained by FIG. 1. Thirdly, when different display screens and/or display screen's images are spatially separated, as shown in FIG. 8 where only two display screens/display screen's images are drawn as an example, each different display screen should be refreshed by the message following the guide line explained by FIG. 1. Under this condition, each display screen may be set to display the whole target scene, or may also be set to display partial target scene around the screen itself or its image. Actually, FIG. 8 may also be implemented by using transparent display screens with different distances to the selective-aperture array.

Through similar structure design, the optical structure shown in FIGS. 9-19 can also be introduced into the display system based on selective apertures of exclusive characteristics.

Figure 21:
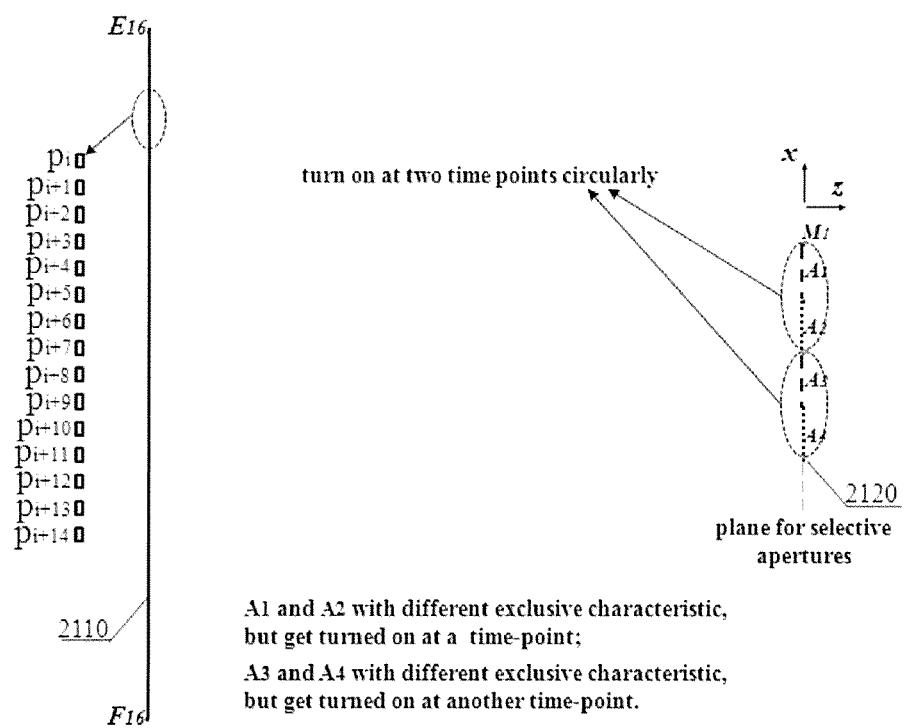
FIG. 21 is an embodiment of a three-dimensional display system with a display screen and selective apertures of complex characteristics.

FIG. 21 shows an embodiment of a three-dimensional display system 2100 with a display screen 2110 and a selective-aperture array 2120 of complex characteristics, which means a selective aperture simultaneously having exclusive characteristics and temporal characteristics. The exclusive characteristics and temporal characteristics of each selective aperture can't be completely the same as those of other apertures. In FIG. 21, N=4 selective apertures are taken as an example. Among them, the apertures $A_1$ and $A_3$ only permit the passing through of lights with an exclusive characteristic, i.e. horizontal polarization direction. The apertures $A_2$ and $A_4$ only permit the passing through of lights with another exclusive characteristic, i.e. vertical polarization direction. On the other hand, $A_1$ and $A_2$ get turned on/off simultaneously, $A_3$ and $A_4$ get turned on/off simultaneously. Their turned-on states get activated sequentially. That is to say, $N_1$=2 exclusive characteristics and $N_2$=2 temporal characteristics construct the N=4 complex characteristics. When two selective apertures with different exclusive characteristics get turned on, pixels with an interval of $N_1-1=1$ pixel are grouped into a pixel set and there will exist two pixel sets. Lights from two pixel sets can pass through the two turned on selective apertures, respectively. In FIG. 21, a row of pixels along the x-direction is shown as an example. Pixels $p_i$, $p_{i+2}$, $p_{i+4}$ . . . are grouped into the pixel set 1 corresponding to the selective aperture $A_1$ and $A_3$, which means they emit lights with a horizontal polarization direction. Pixels $p_{i+1}$, $p_{i+3}$, $p_{i+5}$ . . . are grouped into the pixel set 2 corresponding to selective aperture $A_2$ and $A_4$, which means they emit lights with a vertical polarization direction. According to the guide line explained by FIG. 1, on each sub-screen, pixels belonging to different pixel sets are refreshed by the corresponding partial perspective view, resulting in the presentation of multiple perspective views through the selective-aperture array.

Similar to the optical designs shown in FIGS. 4, 5, 6 and 7, the guiding structure and the combining structure also can be introduced into the display system shown by FIG. 21. When multiple display screens are introduced into the system with selective apertures of complex characteristics, the display screens and/or their images may have three types of message loading modes. Firstly, when the display screens and/or display screens' images overlap with each other, or the display screens and/or display screens' images intersect by a certain included angle, pixels on different display screens and/or their images may be designed with different temporal characteristics or/and different exclusive characteristics. The former means they are activated at different time points. The latter means they emit lights being transparent, respectively, to different selective aperture with different exclusive characteristics. Secondly, when the display screens and/or display screens' images coincide along the depth direction perpendicular to the selective-aperture array, but their pixels take some dislocations along the pixel direction; or when the display screens and/or display screens' images intersect by a certain included angle, and the lines connecting a pixel and corresponding viewpoint are all non-collinear, different display screens should be refreshed by the message corresponding to the turned-on selective aperture simultaneously following the guide line explained by FIG. 1. Thirdly, when different display screens and/or display screen's images are spatially separated, as shown in. FIG. 8 where only two display screens/display screen's images are drawn as an example, different display screen should be refreshed by the message corresponding to the turned-on selective apertures simultaneously following the guide line explained by FIG. 1. Under this condition, each display screen may be set to display the whole target scene, or may also be set to display partial target scene around the screen itself or its image. Actually, FIG. 8 may also be implemented by using transparent display screens with different distances to the selective-aperture array.

Similarly, the optical structure shown in FIGS. 4-7 and 9-19 can also be designed for selective apertures of complex characteristics.

Figure 22:
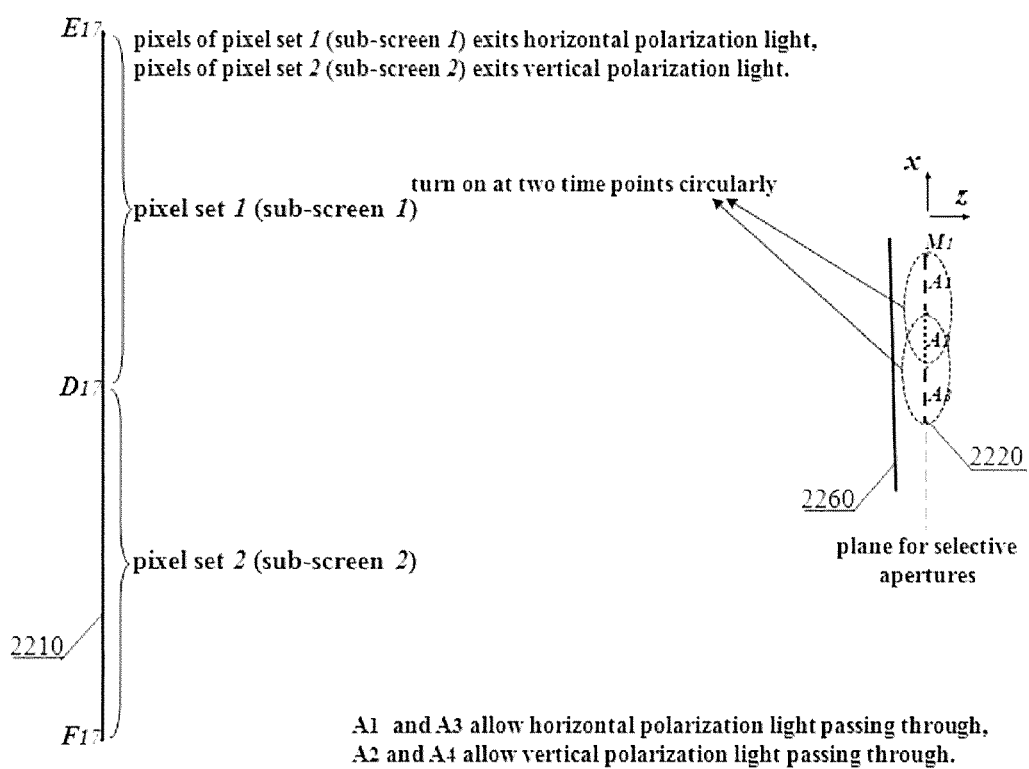
FIG. 22 is an embodiment of a three-dimensional display system with a display screen, a modulation element, and selective apertures of complex characteristics.
Figure 23:
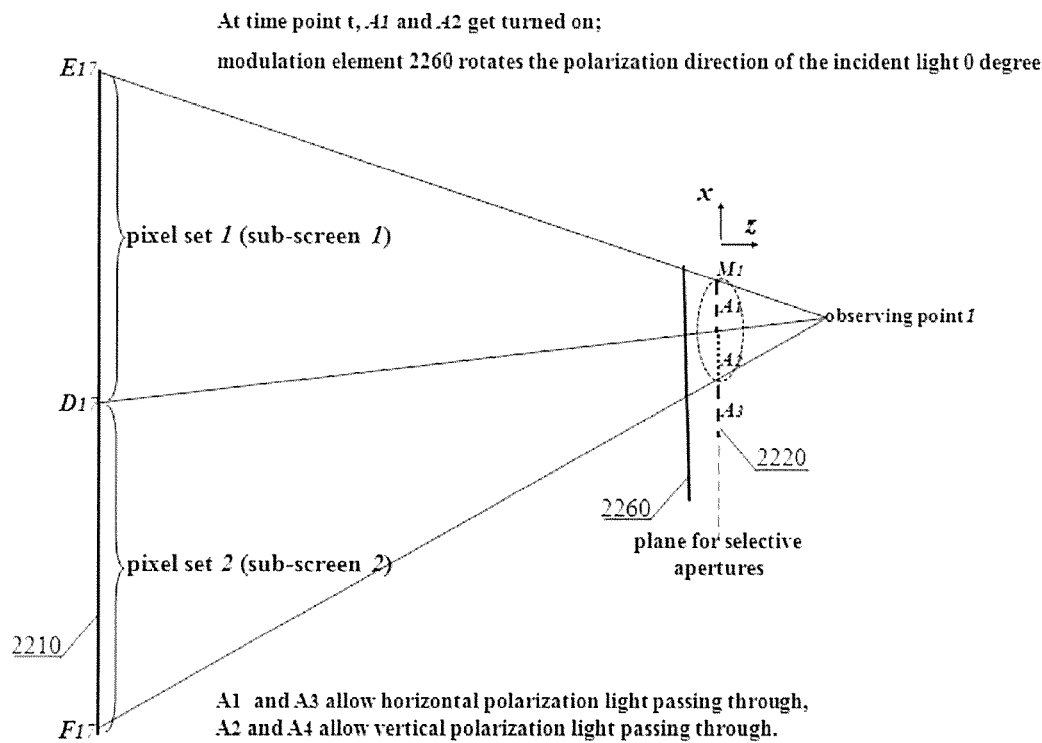
Figure 24:
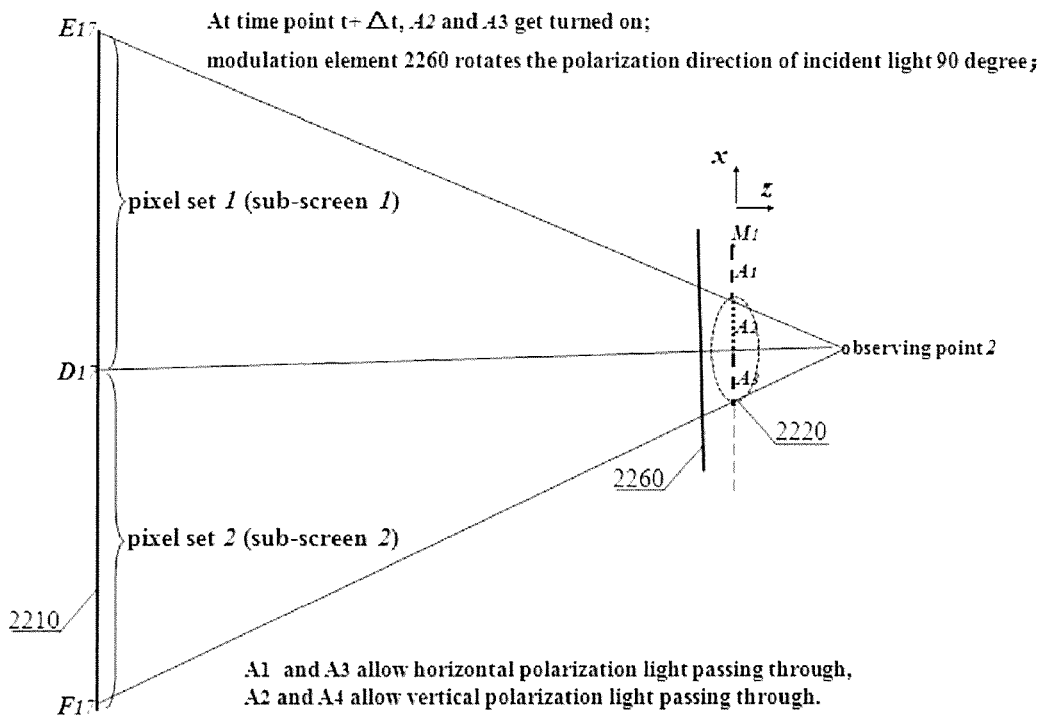

In the embodiment shown in FIG. 21, different sets of pixels are designed by an interlaced arrangement mode. Actually, different sets of pixels may be designed by a non-interlaced arrangement mode. Here two pixel sets and three selective apertures are taken as an example, as shown in FIG. 22. All pixels on sub-screen 1 are grouped into pixel set 1, which transmits horizontal polarization lights. All pixels on sub-screen 2 are grouped into pixel set 2, which transmits vertical polarization lights. Selective apertures $A_1$ and $A_3$ are transparent only to horizontal polarization lights, and selective aperture $A_2$ is transparent only to vertical polarization lights. The modulation element 2260 is located between the display screen 2210 and the selective-aperture array 2220. At the time point t, only $A_1$ and $A_2$ get turned on and the modulation element 2260 lets incident lights passing through at their original state. Then, as shown in FIG. 23, the eye around the observing point 1 can perceive optical messages from the whole display screen 2210. At the next time point t+Δt, only $A_2$ and $A_3$ get turned on and the modulation element 2260 lets incident lights passing through with their polarization direction being rotated by 90 degree. Then, as shown in FIG. 24, the eye around the observing point 2 can perceive optical messages from the whole display screen 2210. Observing points 1 and 2 are the intersection points of lines connecting marginal points of apertures and marginal points of sub-screens, as shown in FIG. 23 and FIG. 24. Here, the modulation element changes the exclusive characteristics of the light from the screen selectively. Following the guide line explained by FIG. 1, two pixel sets of the display screen are refreshed synchronously by the message corresponding to the turned-on two selective apertures at each time point. If the optical information passing through the three selective apertures can be perceived by an eye and the time interval $4t$ is small enough, two light beams passing through a displayed point will superimpose into a real spatial optical point. Similar to what are done in the previous embodiments, the projecting lens, the guiding structure and the compounding structure can be introduced into the system shown in FIG. 22.

Figure 25:
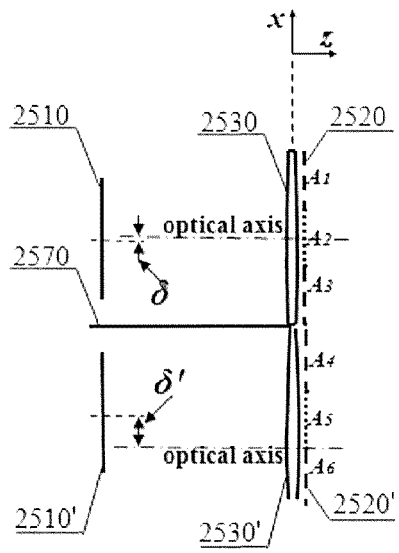
FIG. 25 presents the situation that two embodiments discussed above aligned along a straight line as two units, with a baffle.
Figure 26:
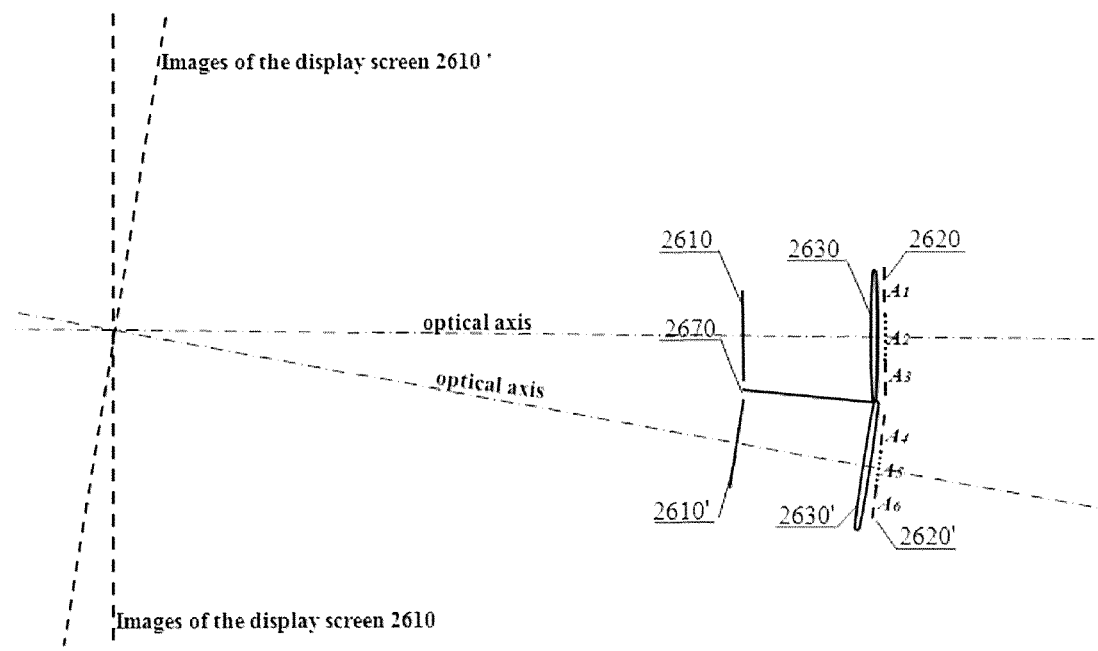
FIG. 26 presents the situation that two embodiments discussed above aligned curvedly as two units, with a baffle.
Figure 27:
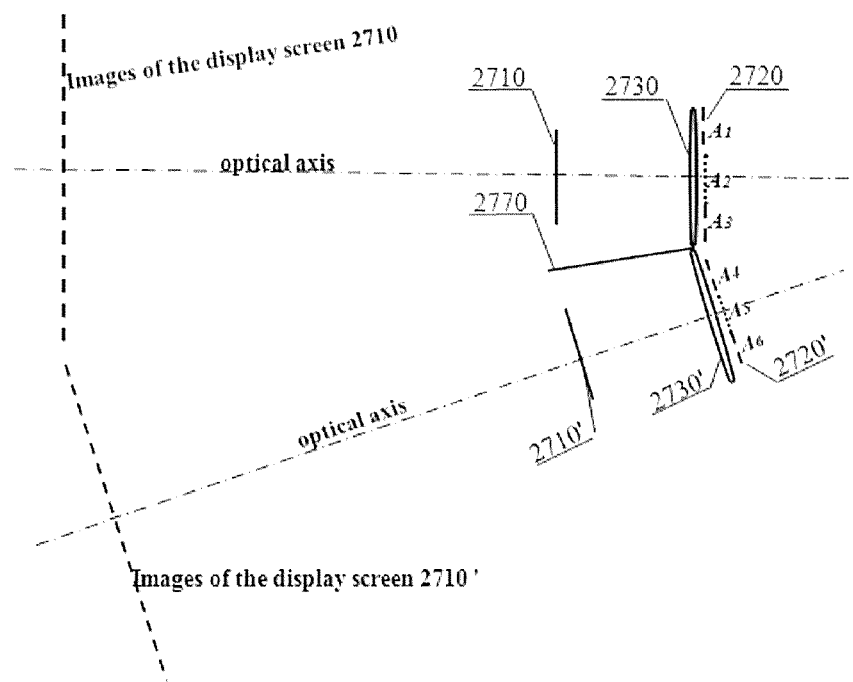
FIG. 27 presents the situation that two embodiments discussed above aligned another kind of curved line.

In the previous patent application U.S. Ser. No. 14,825,854 of the same applicant, multiple light-restricted projection units with each unit being constructed by a display screen and a directional imaging structure (projecting lens) were aligned on a planar plane or a curved surface for three dimensional display with continuous motion parallax. The embodiments with projecting lens described in this patent may be arranged by similar configuration of the light-restricted projection unit in the previous patent application U.S. Ser. No. 14/825,854 of the same applicant, with light beams to non-target projecting lens being blocked by baffles. FIG. 25 shows the situation that two embodiments are aligned side by side as two units with a baffle 2570. The two units may proceed displaying operation independently as described above. Here, each unit is only constructed by a display screen 2510(2510'), a projecting lens 2530(2530'), and a selective-aperture array 2520(2520') for simplicity. Actually, they can be replaced with any embodiments described above. Furthermore, three or more units could be aligned similarly, with more baffles are needed. There is a certain offset between the projecting lens and corresponding screen in each unit to realize overlapping of display screen's images from different units. The offset may also be designed to make the display screen's images partially overlapped, or being adjacent arranged, or being without overlapping. The units also may be aligned along the curved direction, as shown in FIG. 26 and FIG. 27.

A number of embodiments of the invention have been described. Nevertheless, it shall be understood that various modifications may be made without departing from the spirit and scope of the invention. For example, the exclusive characteristics used to allow light beams with only a specific state passing through are not limited to those described above. Any characteristics being with orthogonal states can be used as the exclusive characteristics. For another example, the optical components which are used to image the display screen, to re-direct the propagation direction of the light beams, to combine light beams from multiple display screens, are all not limited to those described above. Any combination of lenses, prisms, diffractive and holographic optical elements, or other light-controlling component may be used for these purposes. Accordingly, other embodiments are within the scope of the following claims.

What is claimed is:

1. A three-dimensional display system based on division multiplexing of a viewer's entrance-pupil comprising:
   a selective-aperture array with each aperture being transparent only to light beams with pre-designed specific characteristics, and at least one display screen for optical information presentation;
   wherein the selective-aperture array is arranged such that, for each selective aperture of the selective-aperture array, light beams from the at least one display screen that pass through the selective aperture only can reach a pupil of the viewer;
   wherein the selective-aperture array guides two or more perspective views from the at least one display screen to the single pupil or each of the pupils of the viewer;
   wherein the selective-aperture array is designed based on one of temporal characteristics, exclusive characteristics and a complex of the temporal characteristics and the exclusive characteristics,
   wherein the temporal characteristics mean that selective apertures are turned on in a time sequential way and the light beams from the at least one display screen only go through the turned-on aperture at a time-point;
   the exclusive characteristics mean a selective aperture is transparent only to the light beams with corresponding characteristics; and
   the complex of the temporal characteristics and the exclusive characteristics means that different groups of apertures are turned on sequentially, and when a group of apertures are turned on, an aperture of the group is only transparent to the light beams with the corresponding exclusive characteristic.

2. The three-dimensional display system based on the division multiplexing of the viewer's entrance-pupil of claim 1, further comprising one or more of following components: a projecting lens to project amplified virtual images of the at least one display screen, a guiding structure to re-direct propagating direction of the light beams from the at least one display screen, a combining structure to group different display screens for the projecting lens, a modulation element to adjust the exclusive characteristics of the light beams from the at least one display screen, and at least one baffle for light beams blocking;
   wherein the light beams from the display screen propagate to the selective-aperture array directly, or be directed to the selective-aperture array by the projecting lens, or by the guiding structure, or by both the projecting lens and the guiding structure; when two or more display screens are employed for one projecting lens, light beams from the display screens are directed to the selective-aperture array by the combining structure, or by both the combining structure and the guiding structure, or by both the combining structure and the projecting lens, or by the combining structure, the projecting lens and the guiding structure; and the light passing through the selective-aperture array enters the eye directly, or be re-directed to the eye through the guiding structure.

3. The three-dimensional display system based on the division multiplexing of the viewer's entrance-pupil of claim 2, wherein the display screen is an emissive display screen, or is a non-emissive display screen, or a reflecting screen which reflects the incident optical image, or a transmitting screen which transmits the incident optical image, or a diffraction screen which diffracts the incident optical image.

4. The three-dimensional display system based on the division multiplexing of the viewer's entrance-pupil of claim 3, wherein the emissive display screen is an organic light-emitting diode display screen, or a light-emitting diode display screen; and the non-emissive display screen is a liquid crystal display screen, or a digital light processing screen.

5. The three-dimensional display system based on the division multiplexing of the viewer's entrance-pupil of claim 2, wherein the projecting lens is a lens, or an optical element functioning as a lens, or a group of optical elements functioning as a lens; and the projecting lens is focal length-tunable lens, imaging the at least one display screen to multiple planes in a time-sequential way.

6. The three-dimensional display system based on the division multiplexing of the viewer's entrance-pupil of claim 2, wherein two or three of the projecting lens, the guiding structure and the combining structure is assembled into one optical structure, comprising a polyhedral optical device which has at least one of a diffracting function, a refracting function and a reflecting function.

7. A three-dimensional display method of presenting two or more perspective views to a single pupil or each pupil of a viewer through a selective-aperture array based on temporal characteristics, comprising:
 (i) segmenting at least one display screen into at least one sub-screen; and
 (ii) at one time-point, turning on a selective aperture, while other selective apertures get turned off; and
 (iii) refreshing pixels on each of the at least one sub-screen by the perspective view converging to a point of the zone enclosed by the lines connecting marginal points of the turned-on selective aperture and marginal points of the sub-screen; and
 (iv) at different time-points, turning on different selective apertures sequentially, with the at least one display screen being refreshed by corresponding message synchronously,
 wherein the selective-aperture array is arranged such that, for each selective aperture of the selective-aperture array, light beams from the at least one display screen that pass through the selective aperture only can reach a pupil of the viewer;
 wherein the selective-aperture array guides two or more perspective views from the at least one display screen to the single pupil or each of the pupils of the viewer.

8. A three-dimensional display method of presenting two or more perspective views to a single pupil or each pupil of a viewer through a selective-aperture array of exclusive characteristics, comprising:
 (i) grouping pixels of at least one display screen into different pixel sets, with all pixels of each pixel set emitting light beams with a pre-designed specific characteristic, which makes the light beams being not blocked only by a corresponding selective aperture;
 (ii) segmenting at least one display screen into at least one sub-screen; and
 (iii) refreshing pixels belonging to each pixel sets on each of the at least one sub-screen by the perspective view converging to a point of the zone enclosed by the lines connecting marginal points of the corresponding selective aperture and marginal points of the sub-screen,
 wherein the selective-aperture array is arranged such that, for each selective aperture of the selective-aperture array, light beams from the at least one display screen that pass through the selective aperture only can reach a pupil of the viewer;
 wherein the selective-aperture array guides two or more perspective views from the at least one display screen to the single pupil or each of the pupils of the viewer.

9. A three-dimensional display method of presenting two or more perspective views to a single pupil or each pupil of a viewer through a selective-aperture array of complex characteristics, comprising:
 (i) dividing the selective apertures into different teams, each of which consists of selective apertures with different exclusive characteristics;
 (ii) grouping pixels of at least one display screen into different pixel sets, with all pixels of each pixel set emitting light beams with a pre-designed specific characteristic, which makes the light beams being not blocked only by a corresponding selective aperture of each team;
 (iii) segmenting at least one display screen into at least one of sub-screen;
 (iv) at one time-point, turning on a team of selective apertures, while other teams of selective apertures get turned off;
 (v) refreshing pixels belonging to each pixel set on each of the at least one sub-screen by the perspective view converging to a point of the zone enclosed by the lines connecting marginal points of corresponding selective aperture and marginal points of the sub-screen; and
 (vi) at different time-points, turning on different teams of selective apertures sequentially, with the pixel sets being refreshed by corresponding messages synchronously,
 wherein the selective-aperture array is arranged such that, for each selective aperture of the selective-aperture array, light beams from the at least one display screen that pass through the selective aperture only can reach a pupil of the viewer;
 wherein the selective-aperture array guides two or more perspective views from the at east one display screen to the single pupil or each of the pupils of the viewer.

* * * * *